US012734669B2

(12) United States Patent
Lamonde

(10) Patent No.: US 12,734,669 B2
(45) Date of Patent: Sep. 15, 2026

(54) HAND TOOLS AND METHOD OF FABRICATION THEREOF

(71) Applicant: GARANT GP, Saint-François-de-la-Rivière-du-Sud (CA)

(72) Inventor: Anthony Lamonde, Levis (CA)

(73) Assignee: GARANT GP, Saint-François-de-la-Rivière-du-Sud (CA)

( * ) Notice: Subject to any disclaimer, the term of this patent is extended or adjusted under 35 U.S.C. 154(b) by 0 days.

(21) Appl. No.: 18/935,812

(22) Filed: Nov. 4, 2024

(65) Prior Publication Data

US 2025/0170698 A1 May 29, 2025

Related U.S. Application Data

(60) Provisional application No. 63/602,415, filed on Nov. 23, 2023.

(51) Int. Cl.
*B25G 3/20* (2006.01)
*A01D 9/02* (2006.01)
*B25G 3/26* (2006.01)

(52) U.S. Cl.
CPC ................. *B25G 3/20* (2013.01); *A01D 9/02* (2013.01); *B25G 3/26* (2013.01)

(58) Field of Classification Search
CPC .......... B25G 1/04; B25G 1/043; B25G 1/046; B25G 3/20; B25G 3/26; A01D 9/02
USPC ........................................... 16/427, 429, 422
See application file for complete search history.

(56) References Cited

U.S. PATENT DOCUMENTS

| | | | | | |
|---|---|---|---|---|---|
| 4,596,484 | A * | 6/1986 | Nakatani | F16M 11/28 | 403/109.5 |
| 4,761,092 | A * | 8/1988 | Nakatani | F16M 11/2021 | 403/109.5 |
| 4,932,622 | A * | 6/1990 | Hayakawa | F16M 11/32 | 248/188.5 |
| 6,305,869 | B1 * | 10/2001 | Chen | B62K 15/00 | 403/DIG. 4 |
| 6,546,596 | B2 * | 4/2003 | Grote | B05C 17/0205 | 16/113.1 |
| 6,553,627 | B1 * | 4/2003 | Horler | B25G 1/00 | 16/427 |
| 6,948,878 | B1 * | 9/2005 | Smith, Jr. | F16B 7/1418 | 70/261 |
| 6,972,042 | B2 * | 12/2005 | Benson | A61F 2/76 | 403/DIG. 4 |

(Continued)

OTHER PUBLICATIONS https://www.decathlon.fr/p/pagaie-de-longe-cote-ajustable-anfibi-en-polycarbonate/_/R-p-X8822813?mc=8822813—Oct. 2023.

(Continued)

*Primary Examiner* — Jeffrey O'Brien
(74) *Attorney, Agent, or Firm* — Gwendoline Bruneau; Lavery, de Billy, L.L.P.

(57) ABSTRACT

An attachment system and method allows reversely operating a working head with a shaft of different lengths selectively. A first hand tool is reversely connected to an extension shaft to obtain a second, longer-shafted hand tool, both fully operational and sturdy for hand-use, according to applications, work conditions and ergonomics. A range of different lengths hand tools may be contemplated, such as shovels, forks, trowels, transplanters, weed cutters, rakes, hoes, planters, and scoops, for example.

3 Claims, 9 Drawing Sheets

(56) References Cited

U.S. PATENT DOCUMENTS 7,124,474 B2 * 10/2006 Nicolay .................... A45F 5/00 16/436
7,302,745 B2 * 12/2007 Stahle ..................... A47L 9/244 403/374.1
7,396,187 B1 * 7/2008 Meyers .............. A47G 27/0487 16/110.1
7,721,391 B2 * 5/2010 Bukovitz ................. B25G 3/14 16/427
7,823,256 B2 * 11/2010 Engelfried .............. B25F 5/026 16/426
7,959,191 B2 * 6/2011 Schouten ................ A47L 13/23 285/298
8,608,118 B2 * 12/2013 Lai ........................ F16B 7/1454 403/374.5
8,776,810 B2 * 7/2014 Lah .......................... A45B 9/00 135/65
8,959,698 B2 * 2/2015 Prosser ................ A46B 5/0083 15/144.1
9,021,661 B2 * 5/2015 Andel ...................... G01V 3/15 16/429
9,050,717 B2 * 6/2015 Mouch ..................... B25G 3/12
9,109,616 B1 * 8/2015 Ballentine ............. F16B 7/1454
9,120,217 B2 * 9/2015 Fischer, Jr. ........... E04D 13/106
9,289,895 B1 * 3/2016 Bauer ...................... B25G 1/04
9,744,662 B1 * 8/2017 Henry ...................... B25G 1/04
10,611,013 B2 * 4/2020 Cavaliere ................. B25G 1/04
11,084,161 B2 * 8/2021 Everingham ......... A47L 9/0673
11,089,860 B2 * 8/2021 Paratore ................ F16B 7/1418
11,118,709 B2 * 9/2021 Hsu ......................... F16L 37/20
11,698,092 B2 * 7/2023 Buckley ................ F16B 7/1454 403/109.1
11,717,952 B1 * 8/2023 Pladson ................... B25G 3/20 16/426
11,780,073 B2 * 10/2023 Hurt ....................... A01B 1/026 16/430
11,890,742 B2 * 2/2024 Lownik .................. B25G 1/043
11,919,143 B2 * 3/2024 Nelson ................. A46B 5/0095
11,992,929 B2 * 5/2024 Sheffield .................. B25G 1/04
12,162,552 B2 * 12/2024 Enriquez ................. E05B 37/02
12,186,883 B2 * 1/2025 Cobián-Méndez ..... A47L 13/38
2007/0209162 A1 * 9/2007 McRoberts ............. B25F 5/026 16/426
2014/0130306 A1 * 5/2014 Andel ...................... B25G 1/04 16/429
2014/0182074 A1 * 7/2014 Mark ................... A46B 5/0095 15/105
2014/0319785 A1 * 10/2014 Chen ..................... B23B 31/201 279/43.5
2016/0288310 A1 * 10/2016 Larouche ................ F16B 7/105
2018/0009099 A1 * 1/2018 Resh ........................ B25G 3/18
2018/0036868 A1 * 2/2018 Maki ........................ B25G 1/04
2021/0399446 A1 * 12/2021 Marchal ............... H01R 43/027
2023/0234207 A1 * 7/2023 Resh ........................ B25G 3/18 81/489

OTHER PUBLICATIONS https://www.materiel-velo.com/1842386-paire-de-blocages-rapides-campagnolo-qr12-buubfr.html—Oct. 2023.

* cited by examiner

HAND TOOLS AND METHOD OF FABRICATION THEREOF

CROSS REFERENCE TO RELATED APPLICATIONS

This application claims benefit of U.S. provisional application Ser. No. 63/602,415, filed on Nov. 23, 2023. All documents above are incorporated herein in their entirety by reference.

FIELD OF THE INVENTION

The present invention relates to hand tools. More specifically, the present invention is concerned with hand tools and a method of fabrication thereof.

BACKGROUND OF THE INVENTION

Hand tools are available in a range of handle or shaft lengths. Short-handled tools allow a user to operate the working tool head from a short distance, while longer-shafted hand tools are useful to manipulate the working tool head from a distance. A given working tool head may be efficiently operated either with a short or long shaft depending on the work at stake.

Typically, tool heads are configured for connection to shafts and cannot be used on their own.

There is still a need in the art for hand tools.

SUMMARY OF THE INVENTION

More specifically, in accordance with the present invention, there is provided a tool, comprising a tool shaft, a tool head, a sleeve removably connecting the tool head to the tool shaft, and a clamp connected to the sleeve between an open position and a closed position; and, i) in the closed position, the clamp locks the sleeve about the tool head, thereby connecting and locking the tool head to the tool shaft; and ii) in the open position, the sleeve is unlocked, thereby unlocking the tool head from the tool shaft.

There is further provided a combination comprising a first shaft of a first length, a first tool, comprising a second shaft of a second length, a sleeve, and a clamp connected to the sleeve between an open position and a closed position; and i) in the closed position, the first shaft and the second shaft are aligned, and the clamp locks the sleeve about the first shaft and the second shaft, thereby connecting and locking the first shaft and the second shaft together, and the first tool to the first shaft into a second tool comprising a third shaft; and ii) in the open position, the sleeve is unlocked thereby unlocking the first tool from the first shaft.

There is further provided an extension shaft for a tool, comprising a sleeve and a clamp connected to the sleeve between an open position and a closed position, with the sleeve comprises an opening, and, i) in the open position of the clamp, the sleeve in configured to receive a free end of the tool; and ii) in the closed position of the clamp, the clamp locks the sleeve about the free end of the tool, thereby connecting and locking the tool to the extension shaft.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further detail by the following non-limiting examples.

Figure 1:
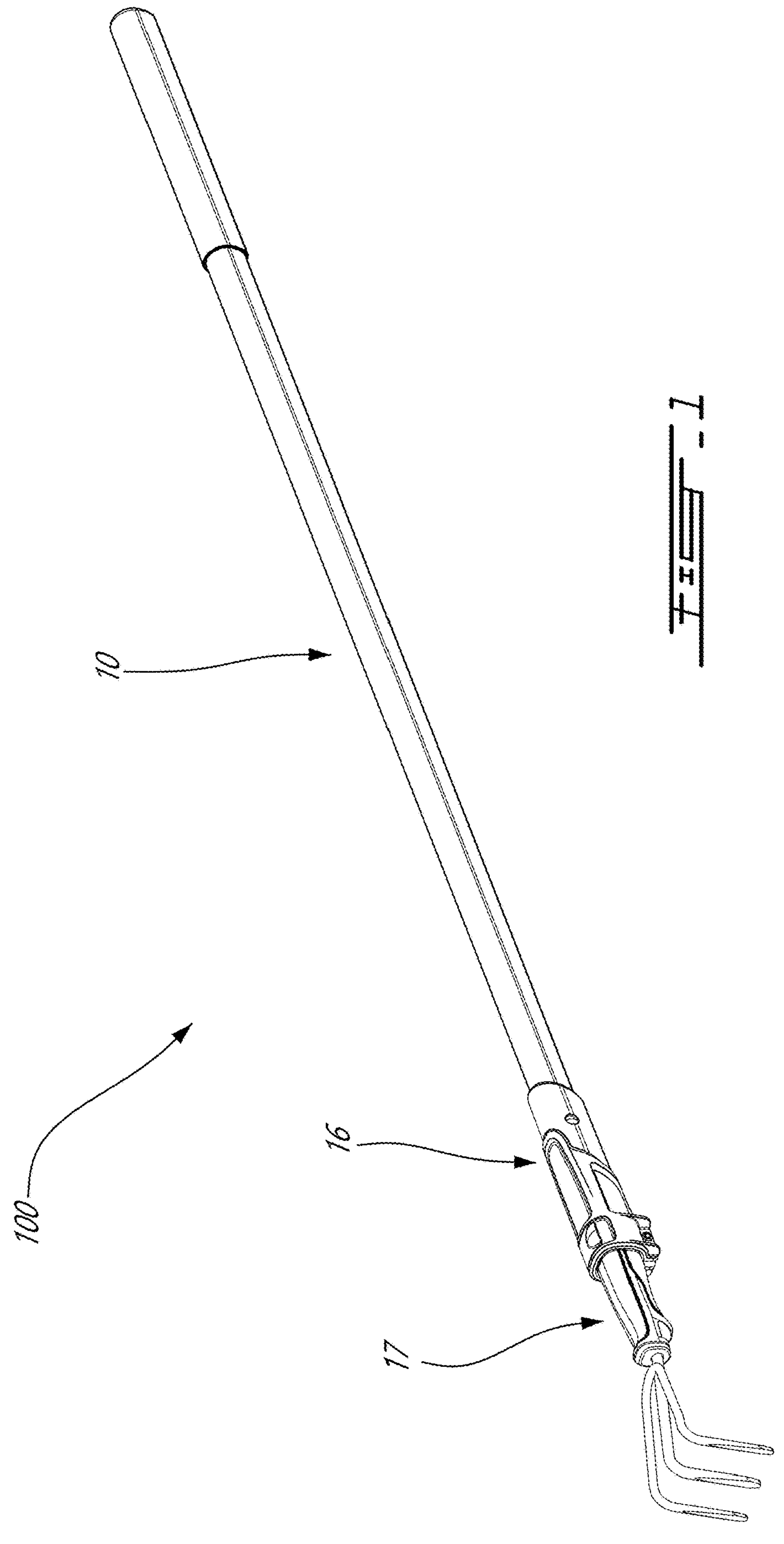
FIG. 1 is a perspective view of a hand tool according to an embodiment of an aspect of the present disclosure.
Figure 2A:
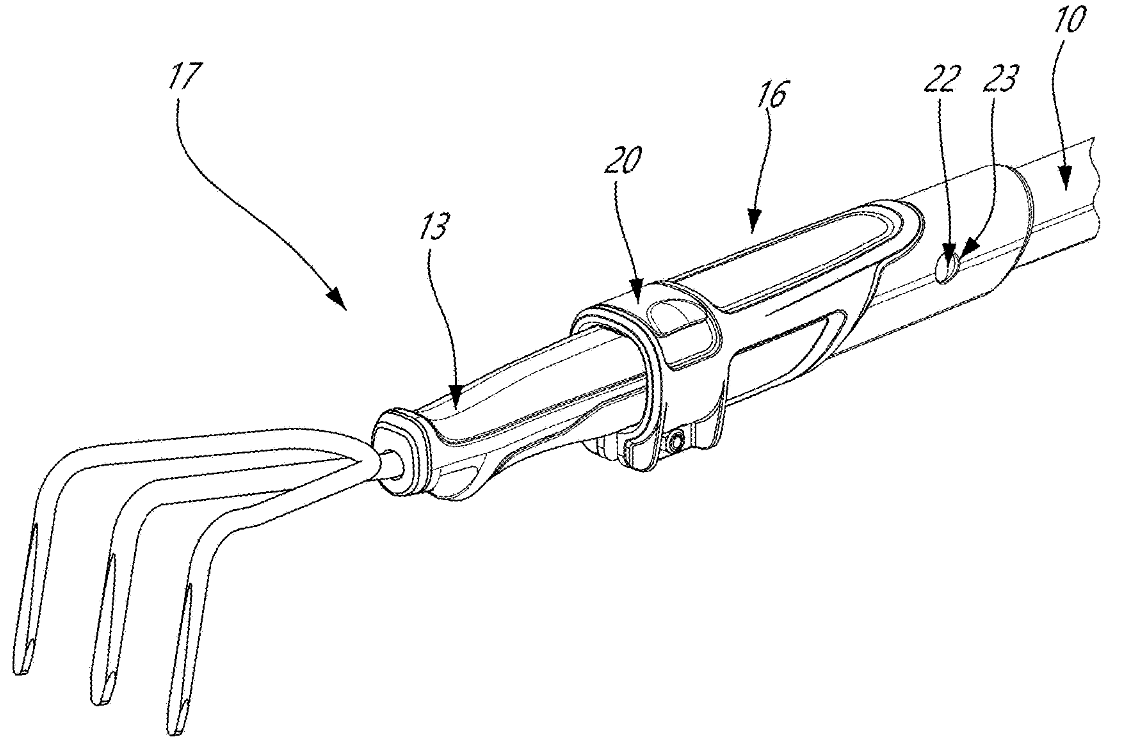
FIG. 2A shows details of FIG. 1 according to an embodiment of an aspect of the present disclosure.
Figure 2B:
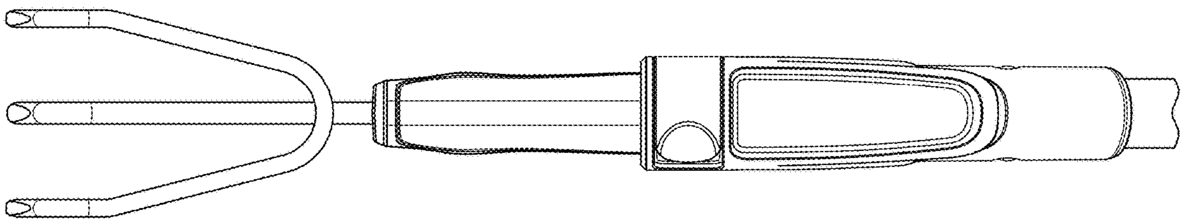
FIG. 2B is a top view of FIG. 2A.

A first hand tool 100 comprising a hand tool shaft 10 and a hand tool head 17 according to an embodiment of an aspect of the present disclosure is shown in FIGS. 1 and 2 for example.

The hand tool 100 is shown as a hand cultivator with a three prongs hand tool head 17 for illustration purposes only. Other hand tools may be contemplated, such as shovel head, a fork head, a trowel head, a transplanter head, a weed cutter, a rake head, a hoe head, a planter head, or a scoop, for example.

Figure 3:
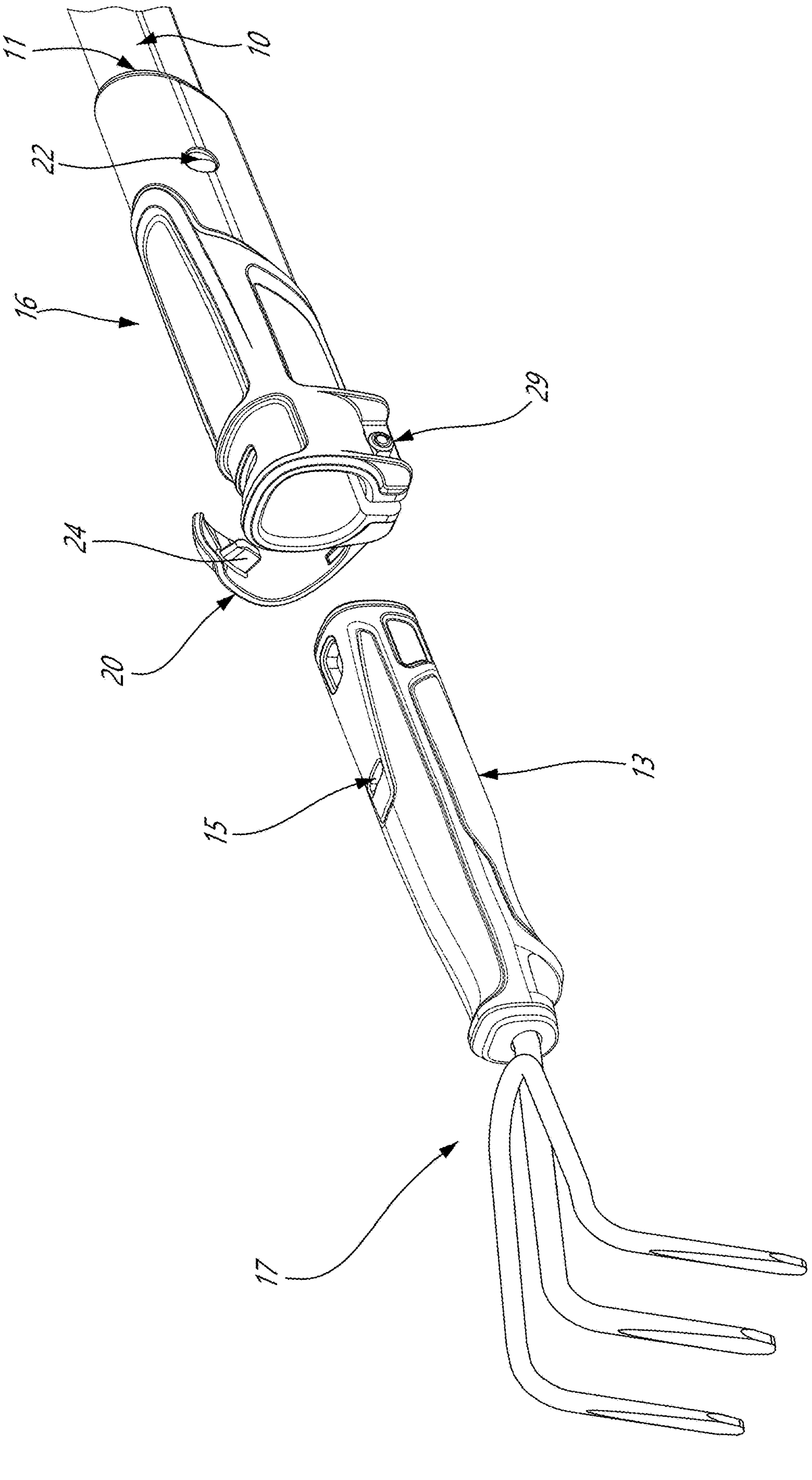
FIG. 3 is an exploded view of FIG. 2A according to an embodiment of an aspect of the present disclosure.

The hand tool head 17 is removably connected to a shaft connection end 11 of the hand tool shaft 10 by a sleeve, such as the slotted sleeve 16 (FIG. 3).

Figure 4:
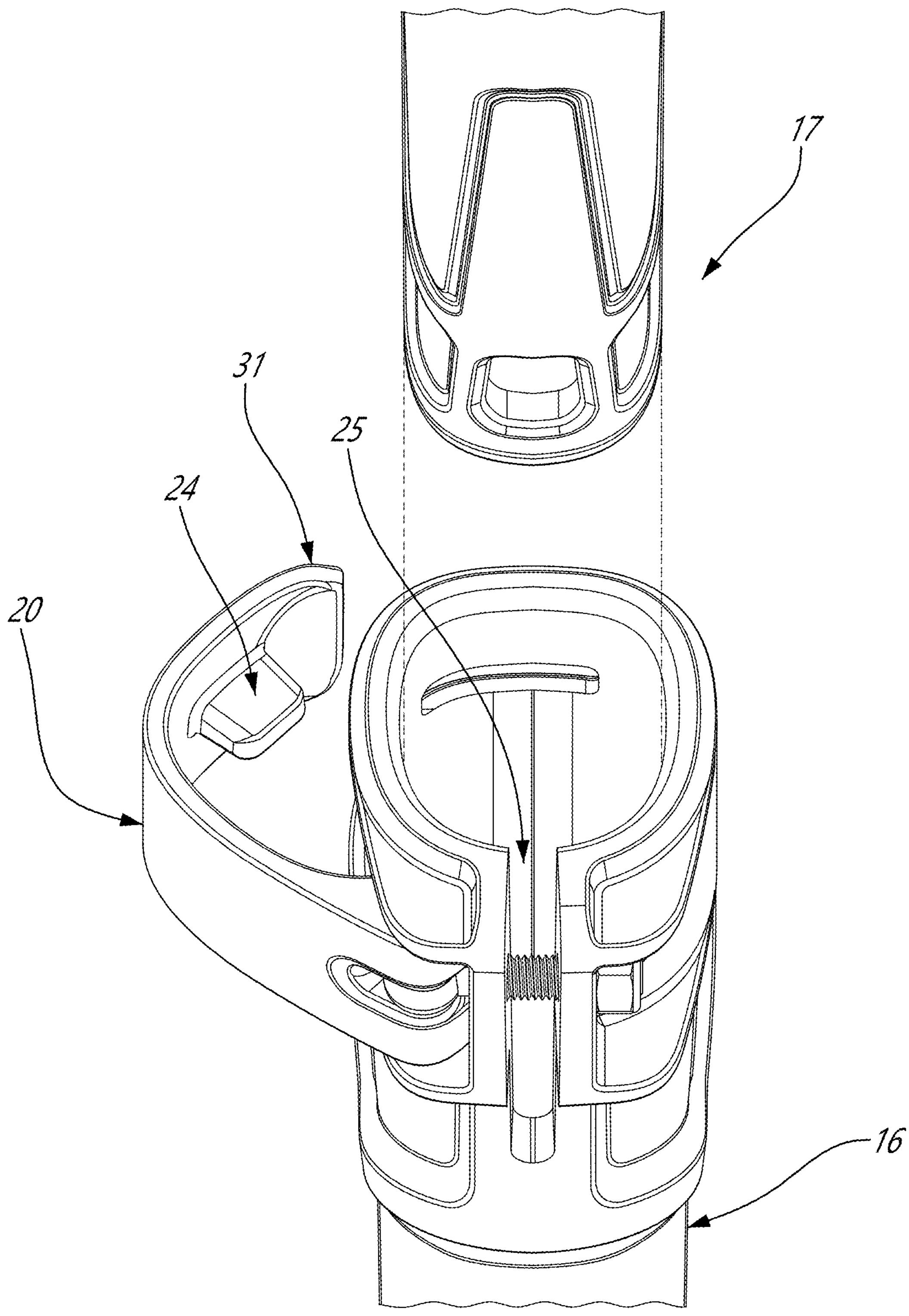
FIG. 4 shows details of FIG. 3.
Figure 5A:
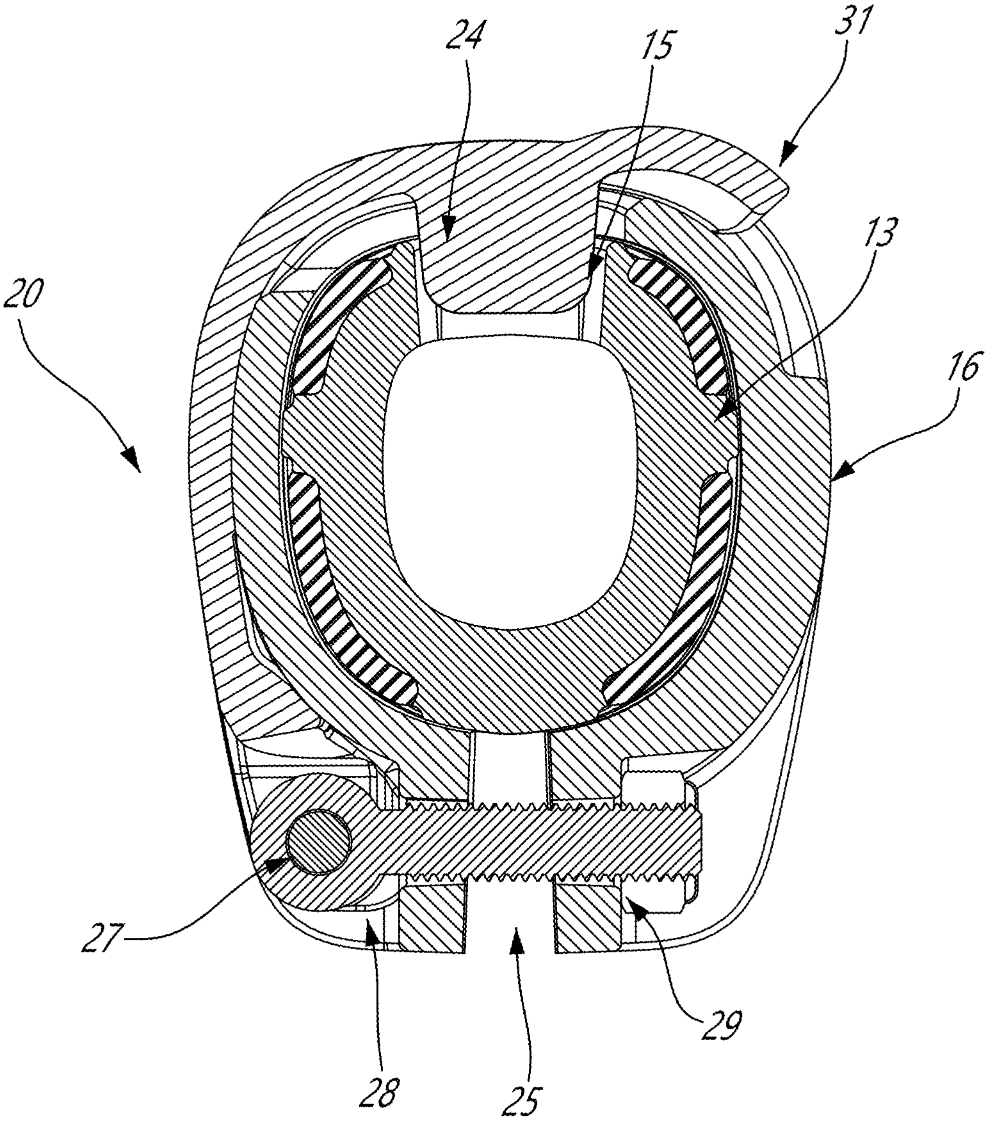
FIG. 5A is a section view of a hand tool in closed position of the clamp according to an embodiment of an aspect of the present disclosure.
Figure 5B:
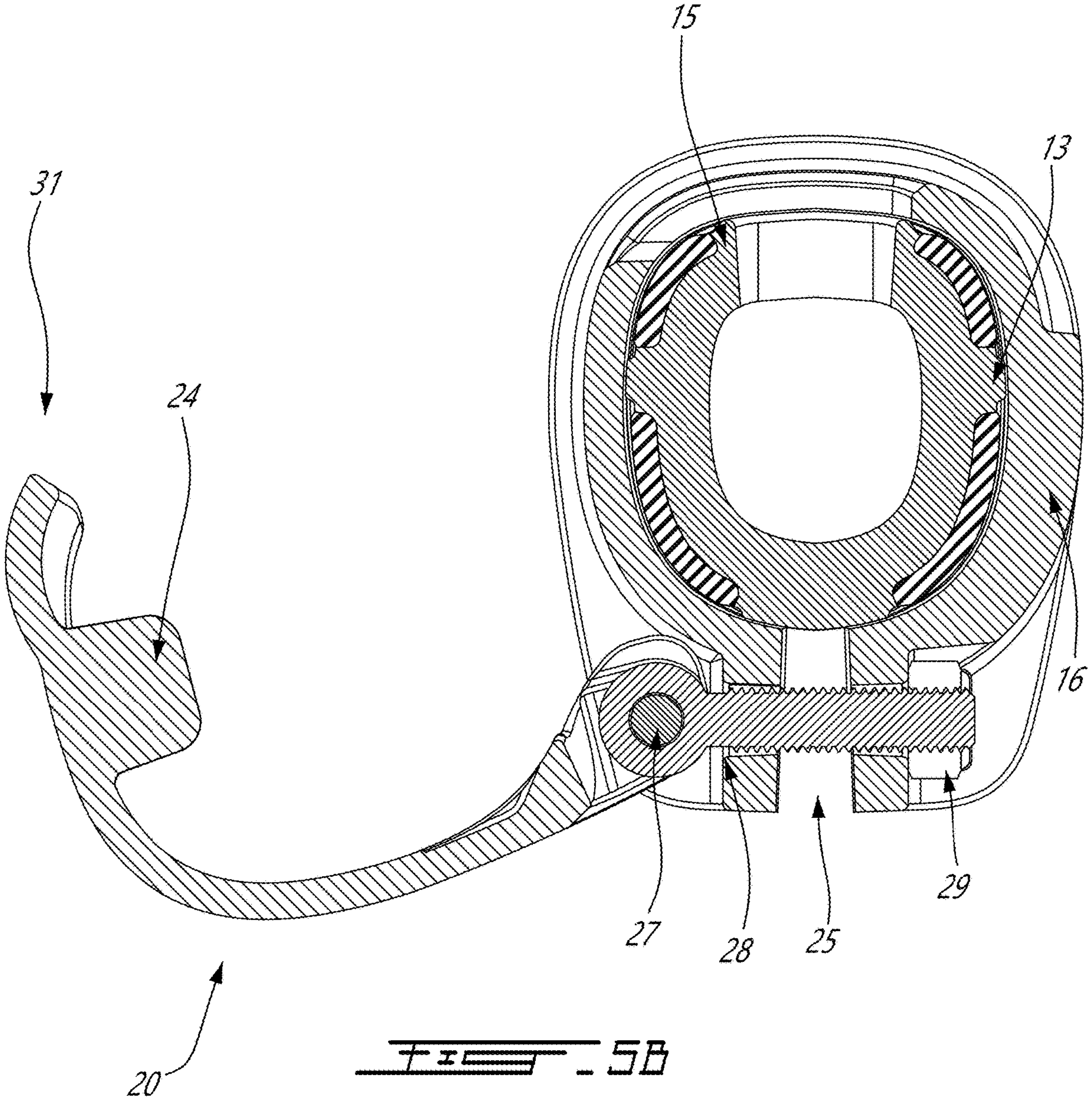
FIG. 5B is a section view of a hand tool in an open position of the clamp according to an embodiment of an aspect of the present disclosure.

A clamp 20, such as an excentric C-clamp clamp 20, is rotatively connected to the sleeve 16 between an open position shown in FIGS. 3, 4 and 5B for example, and a closed position shown in FIGS. 1, 2, 5A for example, about a pin 27 housed in a rod end screw 28.

Figure 6A:
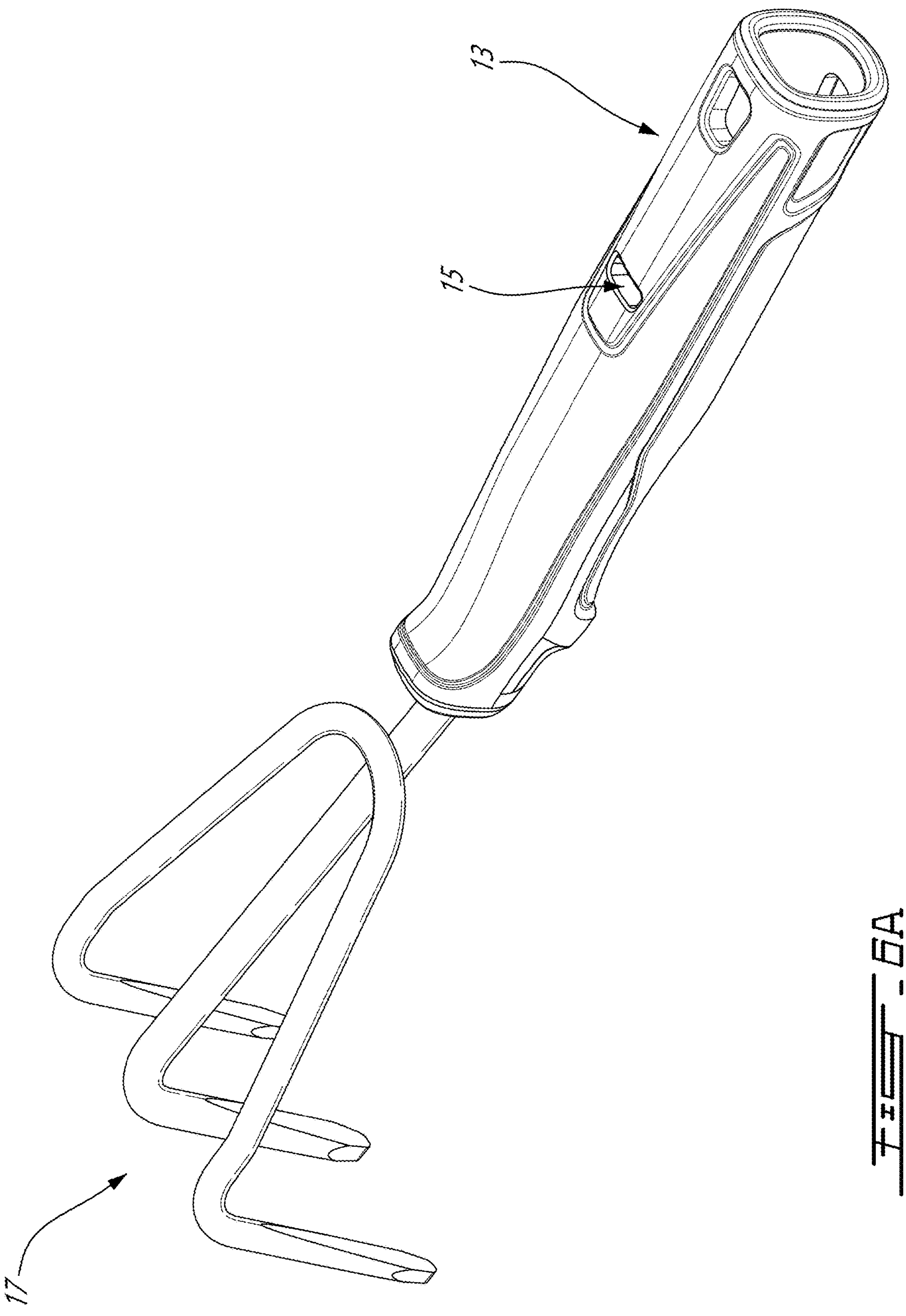
FIG. 6A shows a hand tool according to an embodiment of an aspect of the present disclosure.

In the closed position (FIGS. 1, 2, 5A) shown on the side of the proximal end 13 of the hand tool head 17 for illustration purposes, the interference between the clamp 20 and the sleeve 16 and tightening the sleeve 16 about the proximal end 13 of the hand tool head 17 is controlled by engaging a nut 29 of the rod end screw 28 to varying the width of the slot 25 in the sleeve 16; a locking tab 24 of the clamp 20 clipping into an opening 15 (see FIG. 6A) of the proximal end 13 of the hand tool head 17 mechanically locks the sleeve 16 around the hand tool head 17 in addition to the tightening of the rotated clamp 20 around the sleeve 16 and locks lateral and axial movements between the sleeve 16 and the hand tool head 17.

Axial movement between the sleeve 16 and the hand tool shaft 10 may be controlled using a male/female lock, such as a rivet 22 in the connection end 11 of the hand tool shaft 10 that engages with an opening 23 through the sleeve 16 and the hand tool shaft 10 (FIG. 2A).

When the locking tab 24 clips within the sleeve 16 in the locked position, a click noise may confirm locking between the hand tool head 17 and the hand tool shaft 10.

The hand tool 10 may be disassembled as follows: lifting a free end 31 of the clamp 20 disengages the locking tab 24 of the clamp 20 from the opening 15 of the hand tool head 17 so as to rotate the clamp 20 to the open position shown for example in FIG. 5B.

Figure 6B:
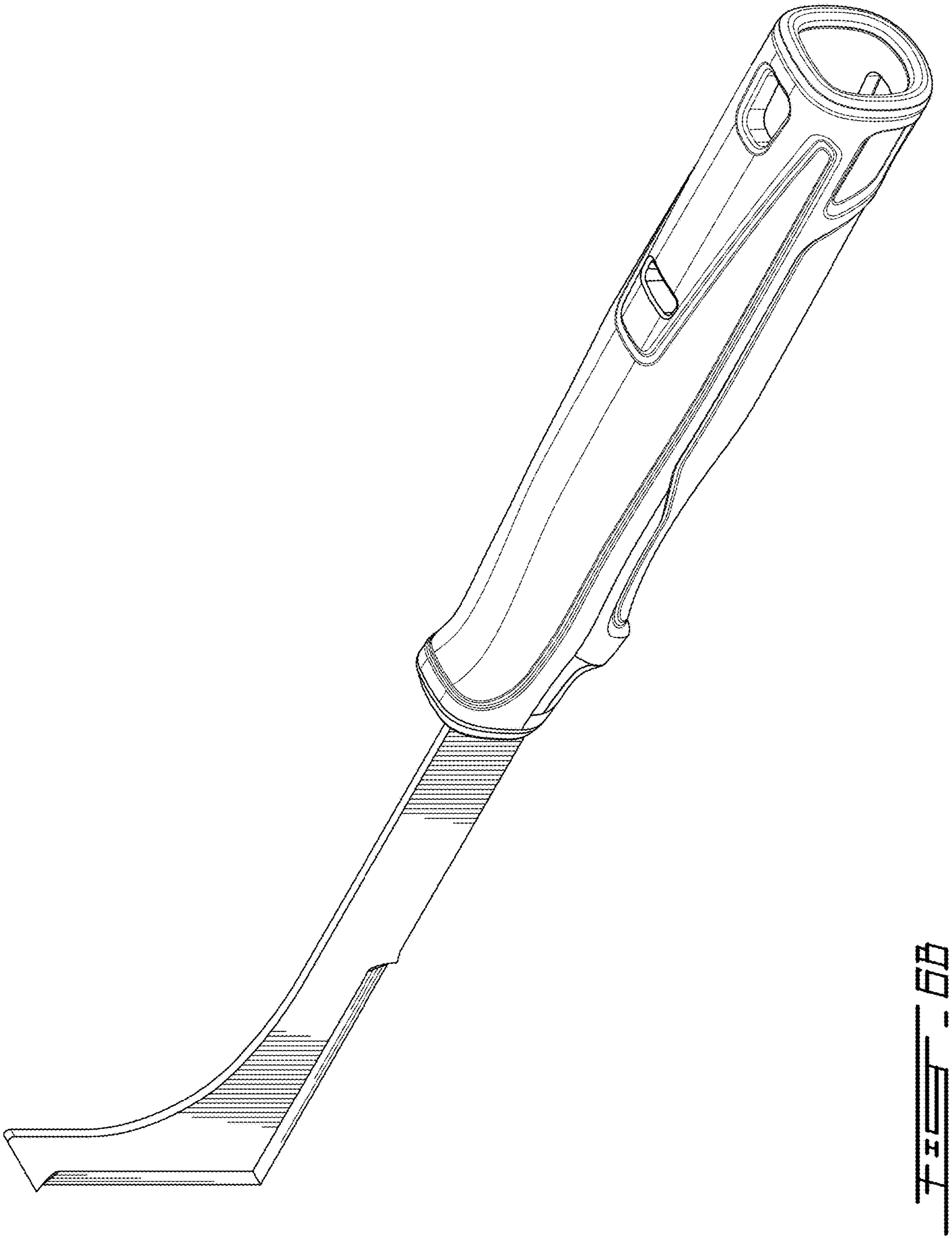
FIG. 6B shows details of the hand tool of FIG. 6A according to an embodiment of an aspect of the present disclosure.
Figure 6C:
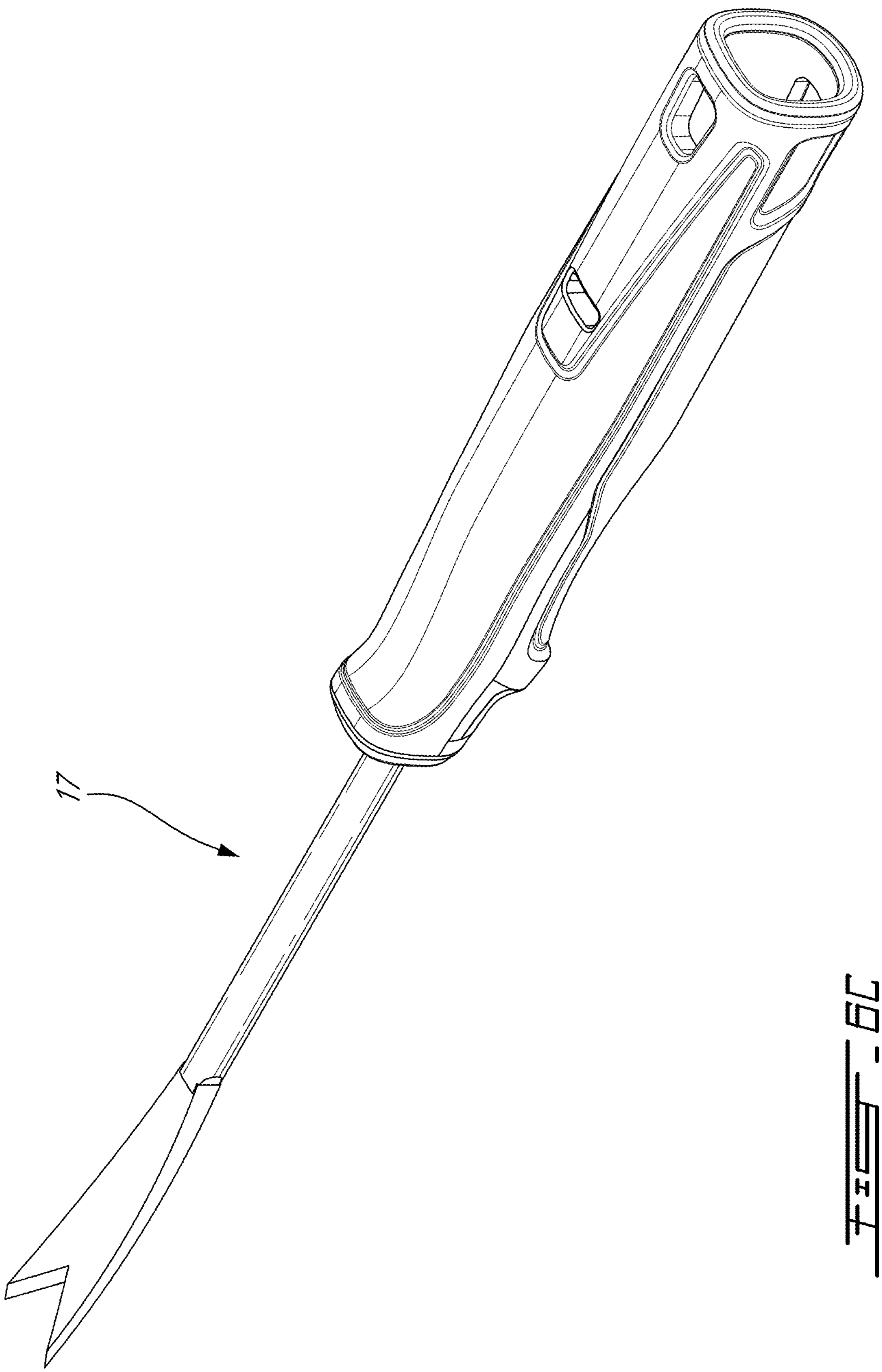
FIG. 6C shows details of the hand tool of FIG. 6A according to an embodiment of an aspect of the present disclosure.

Thus, detached and separated from the hand tool shaft 10, the hand tool head 17 is a second hand tool of its own, as a shorter-shafted alternative to the hand tool 100, as shown in FIGS. 6, with the proximal end 13 as its handle. Reversely, it may be extended into the longer-shafted hand tool 10, as described hereinabove.

There is thus presented an attachment system and method that allows reversely operating a working head with a shaft of different lengths selectively. A first hand tool is reversely connected to an extension shaft to obtain a second, longer-shafted hand tool, both fully operational and sturdy for hand-use, according to applications, work conditions and ergonomics.

A range of different lengths hand tools may be contemplated, such as shovels, forks, trowels, transplanters, weed cutters, rakes, hoes, planters, and scoops, for example.

The scope of the claims should not be limited by the embodiments set forth in the examples, but should be given the broadest interpretation consistent with the description as a whole.

The invention claimed is:

1. A tool, comprising:

a tool shaft;

a tool head;

a slotted sleeve connecting the tool head to the tool shaft; and an excentric C-clamp clamp comprising a locking tab at a free end thereof and connected to the slotted sleeve between an open position and a closed position;

wherein:

in the closed position of the clamp, the clamp tightens the slotted sleeve around a proximal end of the tool head by reducing a slot in the slotted sleeve, thereby locking lateral movements between the tool head and the sleeve, and the locking tab clips into an opening in the proximal end of the tool head, thereby locking axial movements between the tool head and the sleeve;

from the closed position, the clamp untightens the slotted sleeve from around the proximal end of the tool head; and in the open position of the clamp, the locking tab is released from the opening in the proximal end of the tool head, and the tool head is separable from the tool shaft.

2. The tool of claim 1, wherein the clamp is rotatively connected to the slotted sleeve between the open position and the closed position thereof.

3. The tool of claim 1, wherein a connection end of the tool shaft comprises one of a male and a female member configured to receive a corresponding one of a female and male member of the sleeve, for locking axial movements between the tool shaft and the sleeve.

* * * * *